T. S. K. HAWXHURST.
TESTING APPARATUS.
APPLICATION FILED AUG. 19, 1911.
1,096,911.
Patented May 19, 1914.
2 SHEETS—SHEET 2.
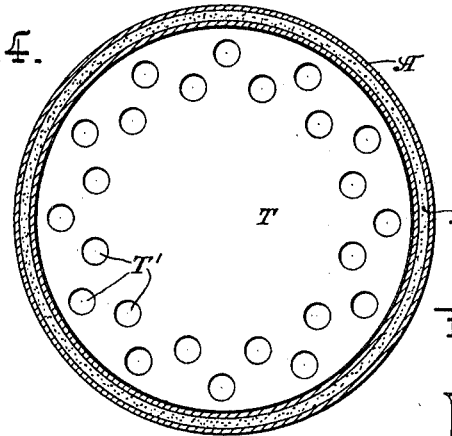
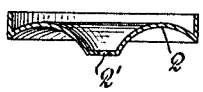
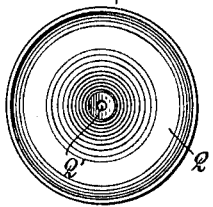
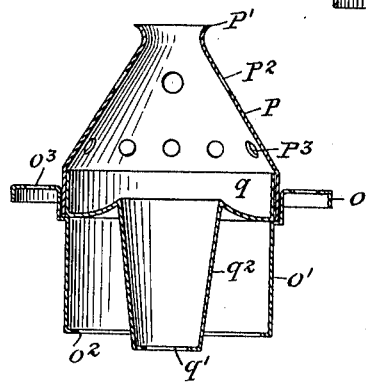
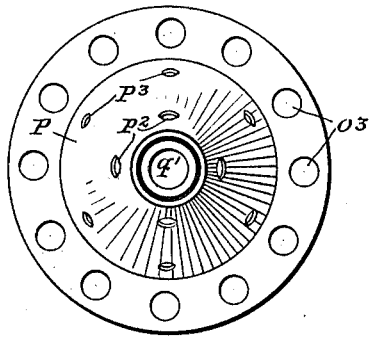
WITNESSES
G. V. Rasmussen
John A. Ferguson
INVENTOR
TIMOTHY S. K. HAWXHURST
BY
Brieser & Knauth
ATTORNEYS

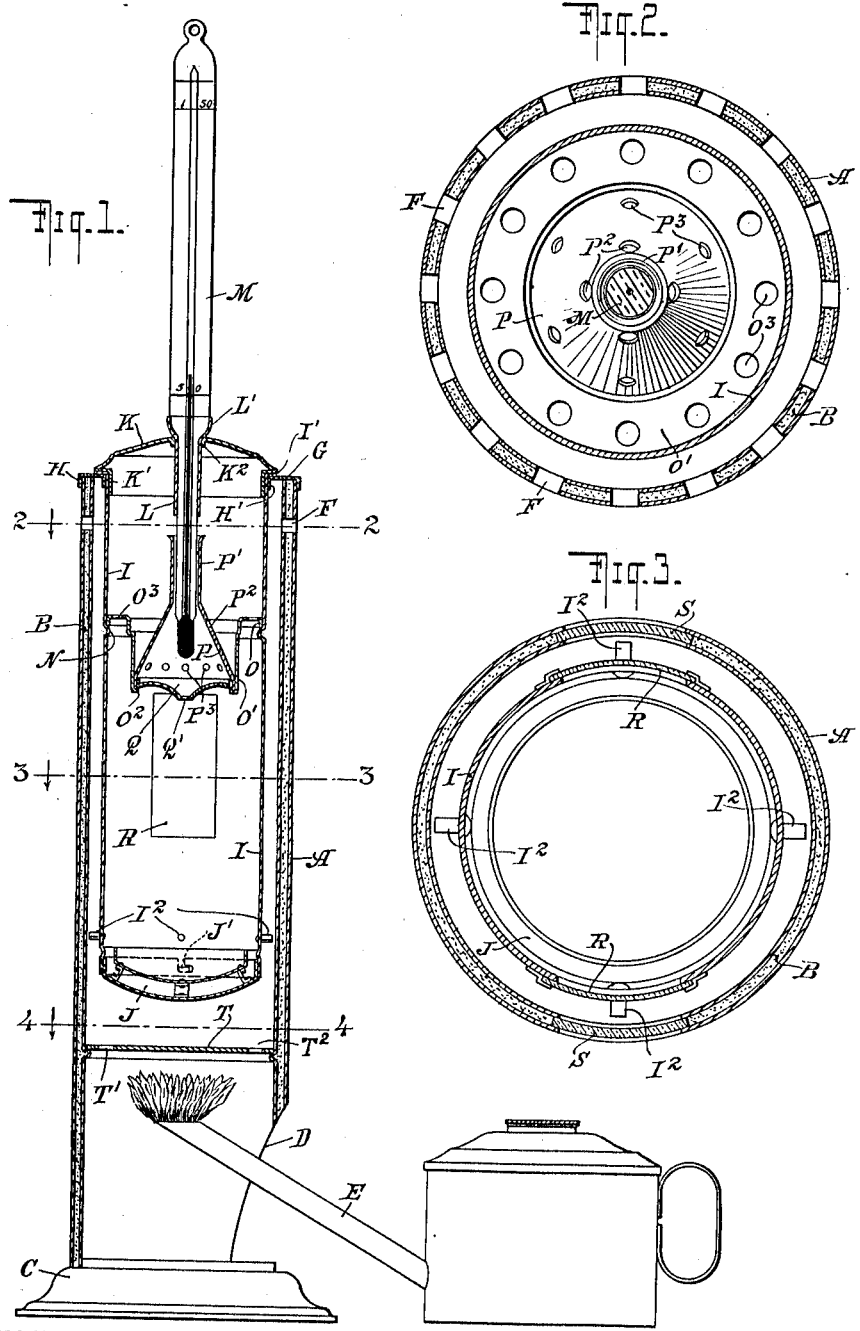

UNITED STATES PATENT OFFICE.

TIMOTHY S. K. HAWXHURST, OF BROOKLYN, NEW YORK, ASSIGNOR OF ONE-HALF TO CHARLES J. TAGLIABUE, OF BROOKLYN, NEW YORK.

TESTING APPARATUS.

1,096,911.     Specification of Letters Patent.     Patented May 19, 1914.

Application filed August 19, 1911. Serial No. 644,934.

*To all whom it may concern:*

Be it known that I, TIMOTHY S. K. HAWXHURST, a citizen of the United States, and a resident of Brooklyn, county of Kings, State of New York, have invented certain new and useful Improvements in Testing Apparatus, of which the following is a specification.

My invention relates to testing apparatus and has for its object to provide a simple and efficient apparatus by means of which the melting point of wax, asphaltum, lubricating grease, pitch, tar, lard and other substances may be tested and the exact temperature thereof positively ascertained.

My invention will be fully described hereinafter and the features of novelty pointed out in the appended claims.

Reference is to be had to the accompanying drawings in which—

Figure 1 is a longitudinal section of my improved apparatus; Figs. 2, 3 and 4 are cross-sections thereof taken respectively on the lines 2—2, 3—3, and 4—4 of Fig. 1; Fig. 5 is a sectional view of the cup for holding the material; Fig. 6 is a plan view thereof; Fig. 7 is a sectional view of the hood used with said cup; Fig. 8 is a detail sectional view of another form of cup and hood and Fig. 9 is a plan view thereof.

The apparatus shown in the drawings which illustrates one specific form of my invention comprises an outer chamber A, preferably having double walls, the space between which may be filled with an insulating material B, such as asbestos or the like, and secured on a support or stand C. An opening D, is provided in said chamber near the bottom thereof, through which a heating medium or temperature raising means, such as an alcohol or other torch E, may be introduced as clearly shown in Fig. 1. A series of outlet openings F are formed in the said chamber A, near its upper portion for the escape of heat or heated air as will be more fully described hereinafter. An annular ring G, having an outer peripheral flange H, and an inner annular flange H' is fitted over the top of said chamber and serves as a support for an inner receptacle I. This receptacle I snugly fits in said ring G, being engaged by the annular flange H', and is formed with a horizontal flange I' arranged to contact with said ring and suspend said receptacle I in proper position within the chamber A, the said receptacle being of smaller diameter than the said chamber, and thus annularly spaced therefrom. Spaced outwardly extending projections $I^2$ are provided at intervals on the outer surface of said receptacle I, near the lower end thereof, and serve to maintain said receptacle centrally of the chamber A. A bottom J is removably secured in said receptacle by means of bayonet connections J' and is preferably dished as shown in Fig. 1. The upper end of said receptacle is preferably closed by means of a cover K, having an annular depending flange K' fitted within said receptacle and being further provided with a central opening, the edge of which is turned inwardly as indicated at $K^2$. A sleeve L extends downwardly through and closely fits this opening and is formed with a cup-shaped or recessed portion L', in which a thermometer or other temperature-indicating means M, is seated, the bulb end of said thermometer extending through and beyond the sleeve L. At a distance from its upper end the receptacle I is provided with a preferably annular projection or bead N, on which rests the flange O of a carrier O', having an inwardly extending flange $O^2$ at its lower end and a series of spaced openings $O^3$ in its upper horizontal portion, which carrier is thus suspended and properly maintained in position in said receptacle.

A hood or chimney P, has its lower end in engagement with the flange $O^2$ so as to be supported thereby, and converges or tapers upwardly into a tubular portion P', which extends over and beyond the end of the thermometer M, and preferably into close proximity to the lower end of the sleeve L. Two series of openings $P^2$ and $P^3$ are formed in said hood or chimney, at points respectively near the upper and lower ends of the converging portion thereof, and serve to establish communication between the interior of said hood P and receptacle I. The flange $O^2$ also serves further to carry a dished or recessed support Q, preferably having a curved bottom which converges or tapers toward an aperture Q' located in said support at its lowest point. This support thus virtually forms a bottom for the hood or chimney P, and serves as a medium for suspending within the receptacle the substance to be tested, the said support Q' hood P and sleeve L being preferably all arranged in axial alinement. At diametrically opposite points or otherwise as desired, the receptacle I is provided with openings or windows R, which register with similar openings or windows S in the chamber A. These openings are each covered with a transparent material and are so located as to make the lower end of the support Q visible therethrough. A baffle plate T, having a series of spaced openings T' near its outer periphery is supported on a preferably annular projection or bead T² formed on the chamber A, at a point below the bottom or lower end of the receptacle I. This baffle plate is thus located between the bottom of the receptacle I and the flame of the torch E, the purpose of which will appear more fully from the description hereinafter.

In the particular illustration, the support Q is intended to contain wax or a similar substance, the melting point of which it is desired to ascertain. In operation after the wax or other substance has been introduced into the support Q and the parts reassembled as shown in Fig. 1, the torch or other temperature-raising means is placed in position in the opening D, so that the flame thereof is spread outwardly toward the openings T'. The heat from the said flame will thus pass through said openings T' and will heat the air in the annular space between the chamber A and the receptacle I. As the said air becomes heated and expands, it is permitted to escape through the opening F, radiation being prevented by the insulating material B, or if this material is omitted by the air space between the walls of the said chamber A. The heat from the air in said annular space will be communicated to the receptacle I, and in turn to the air therein, the temperature of which will thus become higher. This heated air in the interior of the receptacle or the heat therefrom will pass through the openings P² and P³ and will contact with the wax or other substance in the support Q and at the same time act on the bulb of the thermometer M. As the wax or other substance in the support Q is thus subjected to the gradually increasing temperature, it will become softer and softer and a portion or lump thereof will finally drop through the aperture Q'. At the same time, the mercury or other temperature-indicating medium will be correspondingly expanded in the thermometer and the gradually increasing temperature accurately measured on the visible and projecting portion of the thermometer. The dropping of a lump of the substance through the aperture Q' may be seen through the windows R and S by the investigator, and indicates that the particular substance under investigation is being subjected to a degree of heat under which it will melt. As the scale portion of the thermometer projects above the apparatus and is within ready eyesight of the investigator, this degree of temperature may be readily ascertained by consulting the thermometer at the moment the lump of substance drops through the aperture Q'. If desired, the thermometer may be taken from the apparatus the instant this dropping takes place and thus immediately removed from the effects of the temperature within the hood P. After the result has been noted the entire apparatus may be taken apart and the remaining substance removed from the support Q, and at the same time the bottom J into which the substance has dropped from said support may be removed from the receptacle and cleaned. The apparatus is now again ready for the testing of other substances, the operation being repeated. It is, of course, to be understood that the torch E is removed as soon as the above described dropping has taken place so that the parts soon become cool enough to handle.

During the operation above described, the baffle plate T, in addition to spreading the flame and conducting the heat thereof to the points desired has served as a medium for protecting the bottom J of the receptacle from direct contact with the flame of the torch E. The said receptacle is thus evenly heated throughout and no false temperature is created therein, as would be the case if the flame contacted directly with the bottom of said receptacle. In other words, in this latter case a higher temperature might be produced below the support Q than would above it, so that the substance would drop through the aperture Q' sooner and as the thermometer M would not be affected by this higher temperature, the degree of heat indicated thereon would not correctly represent the degree of heat necessary to melt the particular substance under observation.

If it is desired to ascertain the melting point, for instance, of lubricating grease or a similar substance the support shown in Figs. 8 and 9 is substituted in the apparatus. This support q is formed with a relatively deep tapering cup qª having an aperture q' in its lower horizontal wall. This aperture is somewhat larger than the aperture Q' and the capacity of the support q is greater than that of the support Q. The location of this latter form of support and the operation of the apparatus when said last named support is used is otherwise the same as already described.

With my improved apparatus it is thus possible to quickly and simply ascertain the melting point of almost any substance, the only requirement being that the substance introduced into the support Q or q must have a lower melting point than the material of which the apparatus is constructed. The removability of the parts and the simplicity of the assembling and disassembling thereof makes it readily possible to clean the apparatus and to substitute or interchange parts thereof. Other forms of supports adapted to special conditions and substances may therefore be substituted for the supports Q and q, and it is to be understood that I consider such other forms within the scope of my improvement.

Various changes in the specific form shown and described may be made within the scope of the claims without departing from the spirit of the invention. It is also apparent that the device can be readily adapted to test, on the same underlying principle, the melting points of various other substances than those specifically mentioned, and that for instance, lead, solder and other metals or compounds having relatively low melting points, can be advantageously subjected to observation with this apparatus.

I claim:

1. An apparatus of the kind described, comprising an apertured support for suspending the substance to be tested, an apertured hood extending over said support, means for raising the temperature adjacent to said substance, a sleeve arranged in alinement with said hood and temperature-indicating means extending through said sleeve and into said hood.

2. An apparatus of the kind described, comprising an insulated chamber having a window, a receptacle mounted in said chamber so as to be spaced therefrom, and having a window in registry with the window of the chamber, an apertured support mounted in said receptacle for suspending the substance to be tested, means for raising the temperature in said receptacle and a temperature-indicating means carried by said chamber and extending into said receptacle.

3. An apparatus of the kind described, comprising an insulated chamber provided with outlet openings and having a window, a receptacle mounted in said chamber and having a window in registry with the window of said chamber, an apertured support mounted in said receptacle for suspending the substance to be tested, a hood mounted in said receptacle and extending over said support, a temperature-indicating means carried by said chamber and extending into said hood, means for changing the temperature in said receptacle and a baffle plate in said chamber below said receptacle for protecting the bottom of said receptacle against the direct effects of the temperature changing means.

4. An apparatus of the kind described, comprising an insulated chamber provided with outlet openings and having a window, a receptacle mounted in said chamber and having a window in registry with the window of said chamber, a tubular carrier having an apertured flange secured in said receptacle, a hood located in said carrier, an apertured support in said hood for suspending the substance to be tested, a sleeve carried by said chamber in alinement with and connected with said hood, a temperature-indicating means supported in said sleeve and extending into said hood, means for changing the temperature in said receptacle and an apertured baffle plate in said chamber below said receptacle for protecting the bottom of said receptacle against the direct effects of the temperature changing means.

In testimony whereof I have hereunto set my hand in the presence of two subscribing witnesses.

TIMOTHY S. K. HAWXHURST.

Witnesses:
HANS V. BRIESEN,
EUGENE EBLE.

---

Copies of this patent may be obtained for five cents each, by addressing the "Commissioner of Patents, Washington, D. C."